March 31, 1953  O. J. KAY ET AL  2,633,516
OVERHEAT CONTROL
Filed Feb. 19, 1952
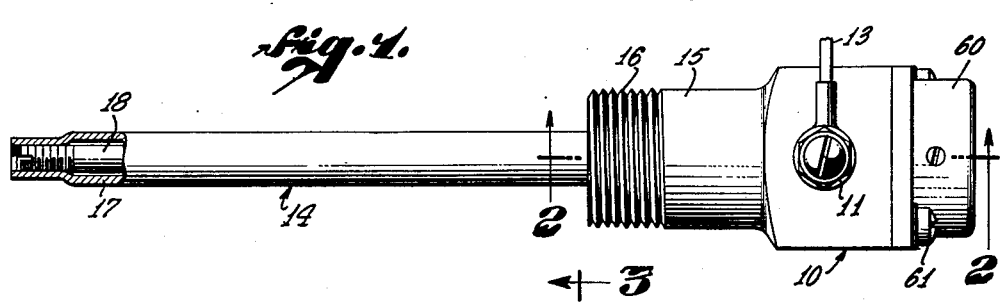
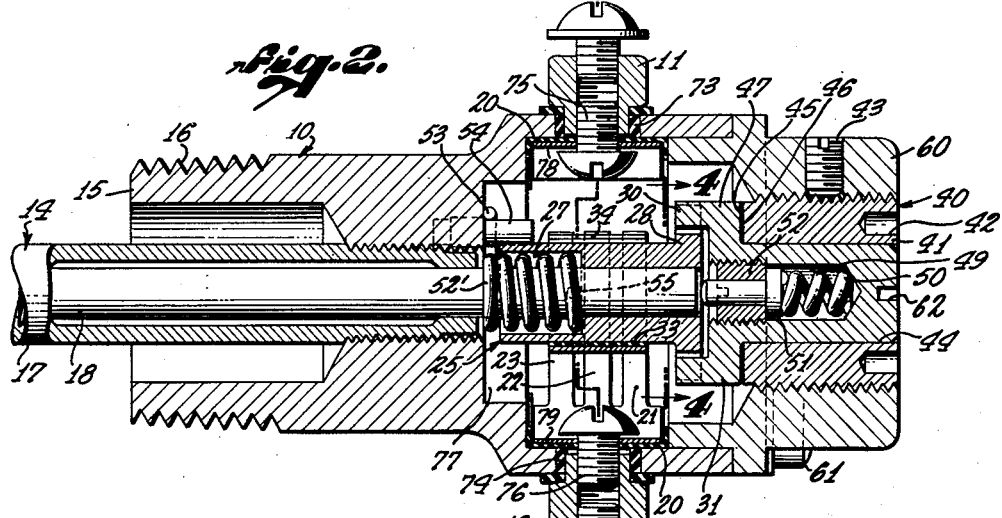
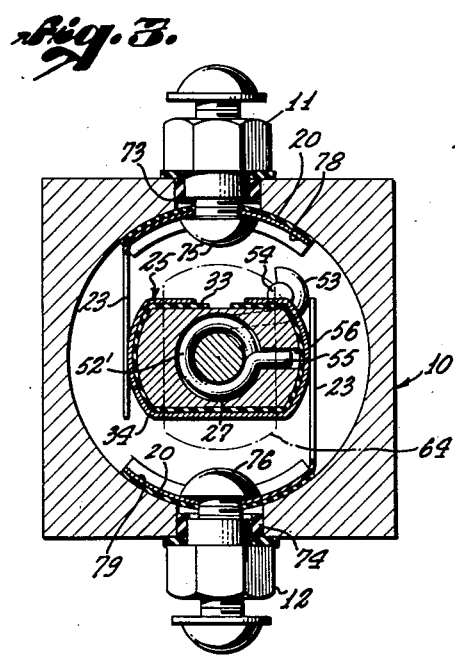
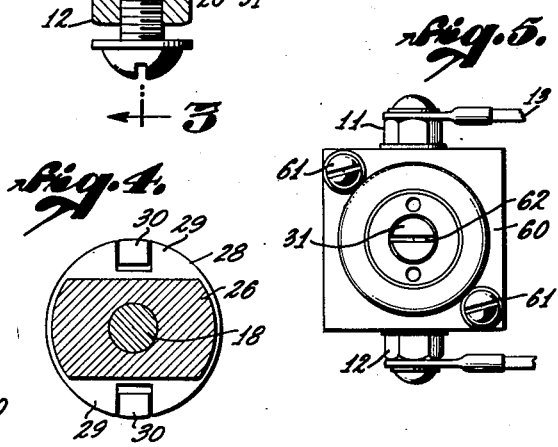
OSCAR J. KAY &
LEROY A. LINGENSJO,
INVENTORS.
HUEBNER, BEEHLER,
WORREL & HERZIG,
ATTORNEYS.
BY Vernon D. Beehler Patented Mar. 31, 1953

2,633,516

UNITED STATES PATENT OFFICE 2,633,516

OVERHEAT CONTROL

Oscar J. Kay, Glendale, and Leroy A. Lingensjo, Encino, Calif., assignors to General Water Heater Corporation, Burbank, Calif., a corporation of Delaware Application February 19, 1952, Serial No. 272,351

5 Claims. (Cl. 200—137)

The application relates to electric cut-out switches and has particular reference to a thermostat controlled electric switch especially adapted to break a circuit so that the circuit remains broken until the switch is manually reset.

A considerable variety of thermostat switches have been designed and marketed for the purpose of controlling the condition of an electric circuit which in turn controls the heating of an appliance. For the most part these switches have constituted primarily thermostat control switches adapted to make and break automatically in response to the heated condition of the appliance. In certain instances overload switches have been incorporated into the automatic thermostat switch. Most of these switches are rather delicate in structure and the overload adjustment, because of infrequent operation, has frequently been prone to become inoperative and thereby refrain from cutting out the circuit at the very time when the circuit needs to be cut out.

It is therefore among the objects of the invention to provide a new and improved self-contained overload switch adapted to be operated by an expansion thermostat.

Another object of the invention is to provide a new and improved thermostat operated overload switch for safety purposes which is simple in design, rugged in construction and positive in action even though remaining idle for long periods of time.

Still other objects of the invention are to provide a new and improved thermostat controlled safety overload switch which is adapted to be reset after having been automatically tripped and which is easy to service, inexpensive to construct, assemble and install, and which is relatively tamper-proof.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a side elevational view of the safety overload switch showing a bulb thermostat attached thereto.

Figure 2 is a longitudinal sectional view on the line 2—2 of Figure 1 drawn to a larger scale.

Figure 3 is a cross-sectional view taken on the line 3—3 of Figure 2 showing the switch in closed position.

Figure 4 is a cross-sectional view taken on the line 4—4 of Figure 2.

Figure 5 is a right end view of the device in the relationship shown in Figure 1.

The safety overload switch forming the subject matter of the present invention is one particularly useful in all types of heating appliances which are controlled by electric energy, although the device is one which when constructed to accommodate a given electric current is capable of being used to change the condition of virtually any electric circuit when the overload switch is tripped automatically by a thermostat device working on the expansion principle. The device here involved is found especially useful as a supplement to the commonly used automatic thermostats on electric controlled appliances of the character of hot water heaters.

In an embodiment chosen to illustrate the invention there is shown a safety overload switch comprising a housing 10 having two binding posts 11 and 12 adapted to be connected to an electric circuit exemplified by the wire 13. A thermostat element 14 is shown connected to an end 15 of the housing having threads 16 which may be attached to an appropriate portion of the appliance.

The thermostat is one of conventional construction consisting of an outer shell, tube or bulb 17 having within it the customary Invar metal rod 18, the bulb being of sufficient length to be immersed in the reservoir of water, for example, if the appliance be a heater, in order to respond to the temperature of the water.

The binding posts 11 and 12 are insulated by bushings 73 and 74 from the housing and have screws 75 and 76 located within a chamber 77 of the housing, the screws being attached respectively to the binding posts 11 and 12. The screws 75 and 76 are adapted to hold respectively contact elements 78 and 79 in position within the chamber 77, these contact elements being insulated from the inner wall of the chamber by an insulating material 20.

It has been found good practice to make the contact elements in such form that they provide a plurality of individual fingers 21, 22 and 23 in each case so that a plurality of contact points may be established. The contact elements are identical on each side of the device, the fingers being resilient and biased so as to maintain contact in appropriate adjustment of the device.

Within the chamber there is provided an armature indicated generally by the reference character 25, the armature comprising a metallic interior member 26 having at one end an axial recess 27 and at the other end a splined head 28. The splined head is provided with individual splines 29 alternating with similar splines 30 on a keeper 31. The intermeshing of the splines provides a non-rotating connection between the metallic element 26 and the keeper 31 but permits endwise movement between the two.

Surrounding the metallic element is an insulating jacket 33 and on the exterior is a switch element 34 so positioned that in closed position for the switch element contact is made between the switch element and both of the contact elements through the respective fingers 21, 22 and 23. When the device is constructed as provided, it will be noted that there are three individual points of contact on each side of the armature or switch.

At the right-hand end of the chamber 77 as viewed in Figure 2 there is provided a closure member indicated generally by the reference character 40, the closure member comprising essentially a bushing 41 having spanner wrench holes 42 and adapted to be threaded into the end of the housing 60 and there anchored by means of a set screw 43. The bushing is provided with a central recess 44 adapted to contain the adjacent portion of the keeper 31. At the inside end of the bushing is a clutch face 45 annular in form and adapted to engage a complementary annular clutch face 46 located upon a shoulder 47 of the keeper.

Within the keeper is a spring chamber 49 in which is located a short rugged compression spring 50 adapted to bear against the head of a button 51 slidable within a small bushing 52 at the interior end of the spring chamber 49. The button in turn is adapted to bear against the inside end of the Invar rod 18 as best seen in Figure 2.

To provide for rotating the armature a torsion spring 52' is located in the axial recess 27 in such manner that one end 53 of the torsion spring is anchored to a post 54 and the other end 55 of the torsion spring is secured within a lateral opening 56 of the wall of the axial recess 27.

When the device is assembled the parts are positioned within the chamber and the closure member 40 secured in place. This is accomplished by fastening a cover 60 upon the housing by means of machine screws 61. In this initial assembly it will be assumed that the thermostat elements are in cold position. In this position the bushing 41 will then be screwed inwardly until there is a friction engagement between the clutches 45 and 46. This is made possible by reason of the fact that as the bushing 41 is screwed inwardly, the inner end of the button 51 is forced against the adjacent end of the Invar rod 18. The spring 50 will provide a strong resilient cushion for the contact. It will be noted that the force of contact of the Invar rod against the button 51 will be transferred through the button 51 and the spring 50 to the keeper 31 and hence the shoulder 47 carrying the clutch face 46 will force the clutch face into frictional engagement with the clutch face 45 on the bushing.

With the parts in the relationship recited the keeper is rotated by implementation of a screw driver slot 62 so that the armature is in a closed position as illustrated in Figures 2 and 3. In making this adjustment the clutch faces are rotated one against the other by the force of turning, using an instrument such as a screw driver.

As the adjustment is made, energy is stored in the torsion spring 52'.

Then with the device in service when the temperature rises to a set amount, depending upon the setting initially made of the position of the bushing 41, the thermostat will respond by expansion of the chamber 77. Because of the fact that the Invar rod 18 undergoes relatively no expension, the rod will be moved away from the button 51, thereby relieving pressure of the clutch face 45 upon the clutch face 46. When this pressure is relieved, there will be nothing to resist the force of the torsion spring 52' which will then rotate the armature 25 in a clockwise direction as viewed in Figure 3 until it stands at 90° with respect to the initial position, as illustrated by the broken line 64 in Figure 3. In this position contact is broken between the contact elements 78 and 79, thereby breaking the circuit through the binding posts.

The circuit will therefore remain broken until the armature is manually reset. This is accomplished by again using the screw driver slot 62 for rotating the armature again back to the solid line position of Figure 3 against the tension of the torsion spring 52' and the frictional engagement of the clutch faces. It will be appreciated that the thermostat will have to return to cold position before the resetting will remain fixed inasmuch as it is necessary that the Invar rod 18 press against the keeper as previously described to create sufficient friction between the clutch faces to hold the setting.

Should it be desired to change the temperature at which the overload switch is to open and break the circuit, it is necessary only to adjust the bushing 41, using the spanner wrench holes 42 so as to rotate it in one direction or another, depending upon whether the switch is to be tripped at a higher or lower temperature.

There has thus been described a simple and rugged overload safety switch which is simple to reset, reusable any number of times, which is relatively fool-proof, and which from its construction is positive in operation.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention, what we claim as new and desire to secure by Letters Patent is:

1. An overheat control adapted to be connected in an electric circuit to change the electric condition of said circuit comprising a housing having a chamber, electric contacts mounted in insulated spaced relation in the chamber, an armature rotatably mounted in the chamber having two rotative positions for respectively closing and opening the circuit, one of said positions being an initial position and the other being a secondary position, and a resilient means connected to the housing biased in a direction to urge the armature from said initial position to said secondary position, friction clutch faces respectively on said armature and the housing, a thermostat having two elements of different expansion characteristics, one element thereof being secured to the housing and another element thereof being in engagement with the armature when in cold position thereby to effect engagement of the clutch faces, said other element when in hot position being released from the armature thereby releasing the clutch faces to enable rotation of the armature to the secondary position by the resilient means.

2. An overheat control adapted to be connected in an electric circuit to change the electric condition of said circuit comprising a housing having a chamber, electric contacts mounted in insulated spaced relation in the chamber, an armature shiftable endwise and rotatably mounted in the chamber having two positions of rotation for respectively closing and opening the circuit, one of said positions being an initial position and the other being a secondary position, and a resilient means connected to the housing biased in a direction to urge the armature from said initial position to said secondary position, friction clutch faces respectively on said armature and the housing, a thermostat having two elements of different expansion characteristics, one element thereof being secured to the housing and another element thereof being in compressed relationship with the armature when in cold position thereby to effect engagement of the clutch faces, said other element when in hot position being released from the armature thereby releasing the clutch faces to enable rotation of the armature to the secondary position by the resilient means, and means accessible from the exterior of the housing adapted to effect resetting of the armature to said initial position.

3. An overheat control for an electrically controlled appliance comprising a housing having a chamber therein, a closure member for the chamber, insulated electric contacts mounted in spaced relation one to another at the interior of the chamber and adapted to be connected in series in a circuit controlling the appliance, a switch element rotatably mounted in the chamber having one position closing the connection between said contacts and another position opening said connection, a torsion spring anchored between the housing and the switch element and biased to shift the switch element to broken position, a rotatable keeper for the switch centrally mounted in the closure member, friction clutch faces respectively between the switch element and the closure member, and a bulb thermostat having a jacket thereof secured to the housing and an interior rod thereof in compressed cushioned relationship with one of the clutch faces when in cold position thereby to effect engagement of the clutch faces, said rod when in hot position being removed from said one clutch element whereby the keeper and switch are free to rotate by force of the torsion spring.

4. An overheat control for an automatic thermostat controlled appliance comprising a housing having means for attachment to the appliance and a chamber therein, a closure member for the chamber, insulated electric contacts in spaced relation one to another at the interior of the chamber and adapted to be connected in series in a circuit controlling the heating of the appliance, a switch element rotatably mounted in the chamber having one position closing a connection between said contacts and another position opening said connection, a torsion spring anchored at one point thereof to the housing and at another point thereof to the switch biased to shift the switch to open position, a rotatable keeper for the switch mounted in the closure member, annular friction clutch faces respectively on the keeper and the closure member, and a bulb thermostat having a jacket thereof secured to the housing and an interior rod thereof in compressed cushioned relationship when in cold position with the keeper thereby to effect engagement of the clutch faces, said rod when in hot position being moved away from the keeper whereby the keeper and switch are free to rotate to open position by force of the torsion spring, and means accessible from the exterior of the housing for rotatably resetting the keeper and switch to closed position when the rod is in cold position.

5. An overheat control for an automatic thermostat controlled appliance comprising a housing having means for attachment to the appliance and a chamber therein, a closure member for the chamber, insulated electric contacts in spaced relation one to another at the interior of the chamber and adapted to be connected in series in a circuit controlling the heating of the appliance, a switch element rotatably mounted in the chamber having one position closing a connection between said contacts and another position opening said connection, a torsion spring anchored at one point thereof to the housing and at another point thereof to the switch element biased to shift the switch element to open position, a rotatable keeper for the switch element mounted in the closure member, annular friction clutch faces respectively on the keeper and the closure member, and a bulb thermostat having a jacket thereof secured to the housing and an interior rod thereof in compressed relationship when in cold position with the keeper thereby to effect engagement of the clutch faces, a spring pressed thrust element in the keeper and in engagement with said interior rod, said rod when in hot position being removed from the keeper whereby the keeper and switch element are free to rotate to open position by force of the torsion spring, splines respectively on the keeper and the switch element non-rotatively engaged and shiftable endwise with respect to each other comprising a drive connection between the keeper and the switch element and means accessible from the exterior of the housing for rotatably resetting the keeper and switch element to closed position when the rod is in cold position.

OSCAR J. KAY.
LEROY A. LINGENSJO.

No references cited.